June 19, 1956 R. S. DUNCAN 2,751,497

SUPERREGENERATIVE TRANSISTOR BROADCAST RECEIVER

Filed Dec. 15, 1953

INVENTOR
R. S. DUNCAN

BY N. S. Ewing
ATTORNEY

United States Patent Office 2,751,497

Patented June 19, 1956

2,751,497

SUPERREGENERATIVE TRANSISTOR BROADCAST RECEIVER

Robert S. Duncan, Orange, N. J., assignor to Bell Telephone Laboratories, Incorporated, New York, N. Y., a corporation of New York Application December 15, 1953, Serial No. 398,283

6 Claims. (Cl. 250—36)

Figure 1:
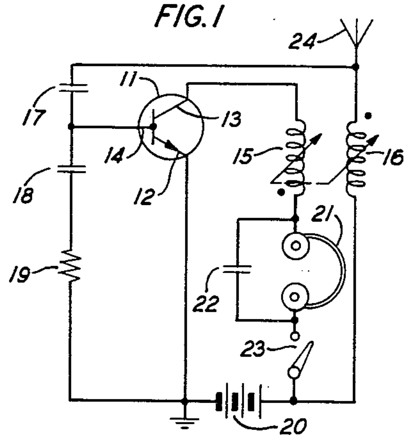

This invention relates generally to superregenerative transistor radio receivers and more particularly, although not exclusively, to superregenerative transistor radio receivers operable over the entire standard broadcast band of frequencies.

In the past, radio receivers of the superregenerative type have often been used to receive amplitude-modulated signal waves when the considerations of primary importance have been circuit simplicity and compactness. Such receivers tend to be simple and compact to the extreme and have the additional advantages of very high sensitivity, automatic selectivity, and inherent automatic gain control. In view of their outstanding qualities of small size and low power requirements, transistors would seem to be readily applicable to the superregenerative receiver field. Difficulties have, however, been encountered whenever it has been attempted to develop a superregenerative transistor receiver for use over such a wide range of frequencies as that represented by the standard radio broadcast band, where the highest assigned carrier frequency is more than three times the lowest. The current gain of the transistor tends to decrease with frequency over such a wide frequency range, with the result that extensive realignment of a superregenerative receiver is generally required whenever it is tuned from one part of the broadcast band to another.

A principal object of the invention is to increase the frequency band over which a superregenerative transistor radio receiver can be tuned without requiring realignment of parameters other than the tuning element.

A related object is to provide a superregenerative transistor receiver which is as simple as possible circuitwise but which is still capable of being tuned over the entire standard radio broadcast band by a single control.

In a principal aspect, the present invention takes the form of a superregenerative radio receiver comprising a transistor feedback oscillator with a self-quenching circuit which cooperates with the oscillator feedback circuit to match the amount of feedback to the current gain characteristic of the transistor over the entire frequency band to be covered by the receiver. The oscillation level of the receiver is thereby maintained substantially constant over the frequency band of interest and any necessity for realignment of the various circuit components after each returning is eliminated. The resulting circuit arrangement is simple and compact and retains the known advantages of superregenerative receivers with respect to sensitivity, selectivity, and automatic gain control while adding those made possible by the low space and power requirements of the transistor.

Figure 2:
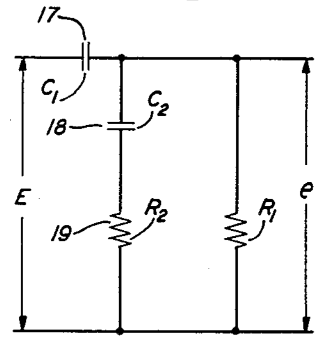
Figure 3:
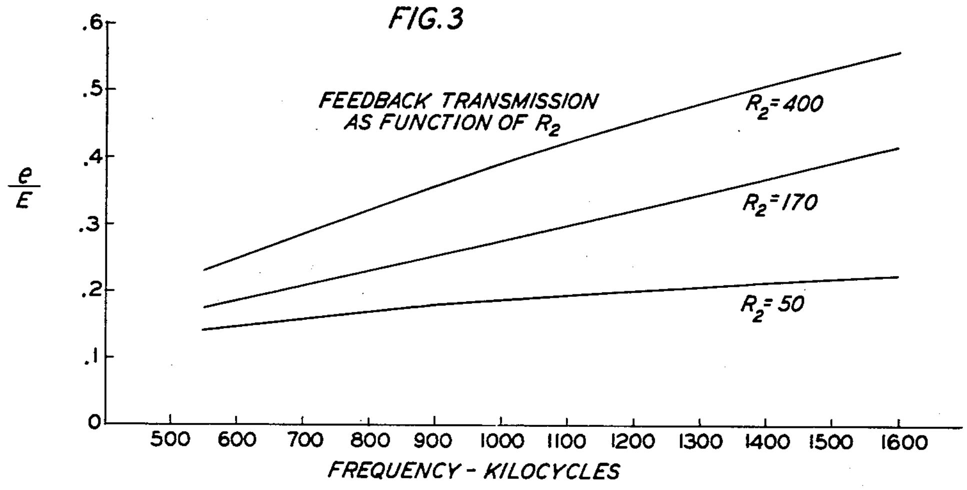
Figure 4:
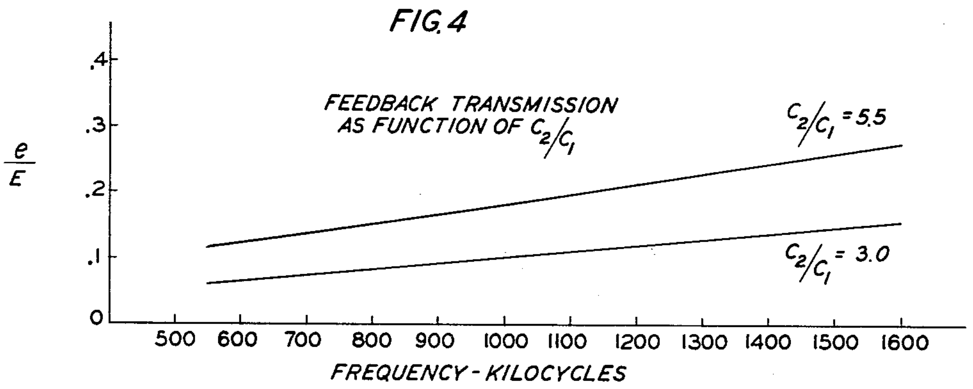

A more complete understanding of the invention may be secured by a study of the following detailed description of a specific embodiment. In the drawings:

Fig. 1 is a schematic diagram showing an embodiment of the invention developed specifically for use in the standard radio broadcast band;

Fig. 2 illustrates the elements in the embodiment of the invention shown in Fig. 1 which control the variation with frequency of the feedback to the input of the self-quenched oscillator; and Figs. 3 and 4 are families of curves showing the manner in which the magnitudes of the elements in Fig. 2 can be varied to fit the current gain versus frequency characteristic of substantially any transistor which it is desired to use.

In Fig. 1, the transistor 11 possesses a semiconductive body and an emitter electrode 12, a collector electrode 13, and a base electrode 14. In the conventional symbol shown, the emitter is indicated by the arrow and the direction of positive emitter current flow is indicated by the direction of the arrow. Thus, since its emitter current normally flows out of the body toward the emitter, an n-p-n junction transistor is represented by a symbol in which the emitter arrow points away from the base. On the other hand, since its emitter current normally flows into the body from the emitter, a junction transistor of the p-n-p type is represented by a symbol in which the emitter arrow points toward the base. For convenience, the conventional transistor symbol used in Fig. 1 has the emitter arrow pointing away from the base and the battery polarity is chosen for the indicated direction of emitter current flow. The invention, however, is not limited to any particular type of transistor. For emitter current flow in the opposite direction, the battery polarity is reversed from that shown.

The embodiment of the invention illustrated schematically in Fig. 1 includes a radio frequency series tuned sine wave transistor oscillator of the so-called common emitter configuration. Base electrode 14 serves as a signal input electrode for transistor 11 and collector electrode 13 serves as a signal output electrode. The oscillator is of the feedback type and includes a regenerative coupling from collector electrode 13 to base electrode 14. This coupling is accomplished through a pair of closely coupled variable tuning inductors 15 and 16 of unity turns ratio, one of which, 15, is connected in series with other elements between collector electrode 13 and emitter electrode 12. Inductor 16, which is reversed in phase from inductor 15, is connected in series with a coupling capacitor 17 between emitter electrode 12 and base electrode 14. A self-quenching circuit composed of a series timing capacitor 18 and discharge resistor 19 is connected between base electrode 14 and emitter electrode 12. The emitter electrode 12 is grounded and a source of direct potential 20 poled to bias collector electrode 13 in the reverse direction is connected between ground and variable inductor 16. Between variable inductor 15 and the ungrounded side of source 20 are connected a set of ear phones 21, a radio frequency bypass condenser 22, and a switch 23. Condenser 22 is connected in parallel with phones 21, and the parallel combination is connected in series with switch 23. An antenna 24 is connected to a point between variable inductor 16 and coupling capacitor 17.

In the embodiment of the invention illustrated in Fig. 1, the following values for a number of the circuit elements may be taken as typical of those which may be used in a radio broadcast receiver:

| | | |
|---|---|---|
| Condenser **17** | micromicrofarads | 500 |
| Condenser **18** | do | 2500 |
| Resistor **19** | ohms | 170 |
| Battery **20** | volts | 5.5 |
| Condenser **22** | micromicrofarads | 400 |

Transistor 11 is an n-p-n transistor of the M–1752 type having an alpha cut-off frequency of at least 3.5 megacycles and the range of inductances for variable inductors 15 and 16 is from approximately 25 to 250 microhenries.

In the operation of the embodiment of the invention shown in Fig. 1, potential source 20 passes current through the body of transistor 11 between collector electrode 13 and emitter electrode 12. The voltage drop across the internal emitter resistance of the transistor causes a charge to build up on timing condenser 18. When the charge on timing condenser 18 builds up sufficiently, it greatly reduces the gain of transistor 11 and the radio frequency oscillator composed of transistor 11, tuning inductors 15 and 16, and coupling capacitor 17 ceases to oscillate. Timing condenser 18 then discharges through the path consisting of discharge resistor 19 and the transistor body between base electrode 14 and emitter electrode 12 until the bias between the base and emitter electrodes re-enters the range in which the transistor gain is sufficient to support oscillations. The charge on timing condenser 18 then begins to build up once more.

The radio frequency oscillator component of the receiver illustrated in Fig. 1 is thus made alternately oscillatory and non-oscillatory at a rate above the usually used audio frequencies. The quench frequency of a receiver using the elements enumerated above, for example, is approximately 12 kilocycles, a value which is sufficiently above the portion of the audio frequency range susceptible of detection by superregenerative receivers so as not to be heard with the demodulated signal.

With the circuit elements listed above, the receiver shown in Fig. 1 can be tuned over the entire standard radio broadcast band of frequencies (e. g., from approximately 550 to approximately 1600 kilocycles). When tuned to recieve an amplitude-modulated signal wave in the broadcast band, the oscillator supports intermittent oscillations at the carrier frequency of the incoming signal wave. As this incoming wave appears at antenna 24, it increases the repetition rate of the bursts of oscillations produced by the radio frequency oscillator in accordance with the instantaneous amplitude of the signal envelope by advancing the respective times at which each burst of oscillations is initiated and quenched. In this manner, the average collector current of transistor 11 is varied with the quenching frequency and the demodulated signal may be taken from the collector circuit. In the embodiment of the invention illustrated in Fig. 1, the radio frequency components of the collector current are bypassed by condenser 22, leaving only the demodulated signal itself to appear in the ear phones 21 to be heard.

The foregoing analysis has proceeded upon the assumption that switch 23 in the emitter-collector path of transistor 11 is closed. Opening switch 23 will open the radio frequency oscillator feedback path and cause the receiver to cease oscillations.

The superregenerative radio receiver shown in Fig. 1 has the usual advantages of self-quenched superregenerative radio receivers in addition to the added advantages made possible by the low space and power requirements of the transistor 11. In the first place, the circuit is simple, compact, and has only one active element. As a result, such receivers can be made to occupy very small spaces and offer a minimum of maintenance difficulties. In the second place, the receiver has the high sensitivity typical of superregenerative receivers. With the circuit element values given by way of example, the receiver illustrated in Fig. 1 has a sensitivity of approximately one or two microvolts. This is a particularly valuable feature when the receiver is used to detect weak signals. Thirdly, the illustrated embodiment of the invention has automatic selectivity in the sense that it can detect only one signal at a time. The radio frequency sine wave oscillator can oscillate at only one frequency and locks in at the frequency of the received wave. If there are two or more interfering signals, only the strongest is detected and the others are rejected. Finally, the receiver shown has the automatic gain control typical of superregenerative receivers. The bursts of oscillations produced by the radio frequency oscillator have the same peak amplitude in all cases. The demodulated signals heard in ear phones 21 are thus of the same volume in all instances, the only audible difference between signals received from weak stations and those received from strong stations being the presence of somewhat more background noise with the former.

As has already been pointed out, the present invention adds to the above-mentioned advantages of superregenerative receivers the advantages of small space and power requirements of transistors. Where factors of space and heat dissipation are important, the advantages of transistor superregenerative radio receivers are self-evident. In the past, however, the applicability of transistors to the superregenerative radio receiver field has been limited. For example, to the best of applicant's knowledge, it has invariably been necessary to realign the circuit of a transistor superregenerative receiver completely whenever the tuned frequency has been changed appreciably. As a result, such receivers have been limited to operations over a relatively narrow radio frequency band. The present invention completely overcomes this difficulty without necessitating any circuit complications which would detract from the size and simplicity advantages of the receiver.

In most transistors, the variation of the current gain of the transistor with frequency can be represented by the expression $$\alpha = \frac{\alpha_0}{1 + j\frac{f}{f_0}}$$

where $\alpha$ is the current gain of the transistor, $\alpha_0$ is the value of $\alpha$ at the low frequency end of the spectrum, $f$ represents frequency, and $f_0$ is the so-called alpha cut-off frequency, i. e., the frequency at which $\alpha$ is down three db from its low frequency value. It can thus be seen that the value of $\alpha$ can decline considerably from its low frequency value if the frequency range over which the transistor is to be operated is sufficiently great.

In a superregenerative radio receiver, it is necessary that the amplitude of the radio frequency oscillations generated by its oscillator component be constant over the entire frequency band of its operation. This is what has in the past necessitated the complete realignment of transistor superregenerative receivers when their tuning has been changed over a wide band. Over a wide band, the reduction in the magnitude of $\alpha$ with frequency has the effect of sharply reducing the magnitude of the generated oscillations, and realignment has been necessary to restore the oscillation magnitude to its proper level.

The present invention overcomes this difficulty by utilizing elements already included in the receiver as basic components thereof to maintain the radio frequency oscillation level constant over the entire operating frequency band. In the embodiment of the invention illustrated in Fig. 1, coupling capacitor 17 and timing capacitor 18 cooperate with discharge resistance 19 and the internal base resistance of transistor 11 to form a potentiometer which matches the amount of feedback between collector electrode 13 and base electrode 14 to the current gain characteristic of transistor 11 over the entire standard radio broadcast band. The level of oscillations produced by the radio frequency oscillator component of the receiver is thereby maintained constant over the entire standard radio broadcast band and tuning by variation of a single control, i. e., that controlling variable inductors 15 and 16, is made possible.

The nature of the stabilization made possible through this additional use of coupling capacitor 17 and timing capacitor 18 may best be illustrated with the aid of Figs. 2, 3, and 4. Fig. 2 shows the elements of the receiver which control the amount of feedback to the base electrode of transistor 11. The capacity of coupling capacitor 17 is represented by $C_1$, that of timing capacitor 18 is represented by $C_2$, the resistance of discharge resistor 19 is represented by $R_2$, and the series combination internal base resistance and the internal emitter resistance of transistor 11 is represented by $R_1$. E is the voltage between the side of coupling capacitor 17 most remote from transistor 11 and ground and $e$ is the voltage across $R_1$.

Fig. 3 is a family of curves showing the variation of $e/E$ with frequency over the standard radio broadcast band with $C_1$ equal to 500 micromicrofarads, $C_2$ equal to 2500 micromicrofarads, $R_1$ equal to 200 ohms, and $R_2$ as a parameter. Fig. 4 is a somewhat similar family of curves in which the fixed values are $C_2$ equal to 600 micromicrofarads, $R_1$ equal to 200 ohms, and $R_2$ equal to 500 ohms and $C_2/C_1$ is the parameter.

Figs. 3 and 4 illustrate how, in accordance with the principles of the invention, the feedback transmission to the base electrode of transistor 11 in the receiver shown in Fig. 1 can be controlled to fit the current gain characteristic of the transistor over the entire frequency band in which the receiver is to be operated. The feedback controlling potentiometer is formed by elements already in the circuit as basic components and thus does not defeat a principal purpose of the use of a regenerative receiver by increasing circuit complexity. In the specific embodiment of the invention which has been described, the element values are such that the middle curve of Fig. 3 fits the current gain characteristic of the transistor. For other transistors, other values for the circuit elements making up the feedback controlling potentiometer may be required.

It is to be understood that the above-described arrangement is illustrative of the application of the principles of the invention. Numerous other arrangements may be devised by those skilled in the art without departing from the spirit and scope of the invention.

What is claimed is:

1. A superregenerative radio receiver for operation over a predetermined frequency band which comprises an oscillator in the form of a transistor having a semi-conductive body and emitter, collector, and base electrodes and a current gain factor which decreases with frequency over said predetermined frequency band, one of said electrodes serving as an input electrode and another of said electrodes serving as an output electrode, and a regenerative feedback circuit coupling said output electrode to said input electrode, and circuit means cooperating with said feedback circuit to match the amount of feedback from said output electrode to said input electrode to the current-gain frequency characteristic of said transistor coupled between said input electrode and the third of said electrodes to render said oscillator alternately oscillatory and non-oscillatory, whereby a substantially constant level of oscillation is maintained over the entire said frequency band of operation of the receiver.

2. A superregenerative radio receiver for operation over a predetermined frequency band which comprises an oscillator in the form of a transistor having a semi-conductive body and emitter, collector, and base electrodes and a current gain factor which decreases with frequency over said predetermined frequency band, one of said electrodes serving as an input electrode and another of said electrodes serving as an output electrode, and a regenerative feedback circuit coupled from said output electrode to said input electrode through a coupling capacitance, and circuit means including a timing capacitance coupled between said input electrode and the third of said electrodes to render said oscillator alternately oscillatory and non-oscillatory, said coupling capacitance and said timing capacitance cooperating to match the amount of feedback from said output electrode to said input electrode to the current-gain frequency characteristic of said transistor to increase the amount of feedback with frequency over said predetermined frequency band and maintain a substantially constant level of oscillation over the entire said frequency band of operation of the receiver.

3. A superregenerative radio receiver for operation over a predetermined frequency band which comprises an oscillator in the form of a transistor having a semi-conductive body and emitter, collector, and base electrodes and a current gain factor which decreases with frequency over said predetermined frequency band, said base electrode serving as an input electrode and said collector electrode serving as an output electrode, and a regenerative feedback circuit coupling said collector electrode to said base electrode, and circuit means cooperating with said feedback circuit to match the amount of feedback from said collector electrode to said base electrode to the current-gain frequency characteristic of said transistor coupled between said base electrode and said emitter electrode to render said oscillator alternately oscillatory and non-oscillatory, whereby a substantially constant level of oscillation is maintained over the entire said frequency band of operation of the receiver.

4. A superregenerative radio receiver for operation over a predetermined frequency band which comprises an oscillator in the form of a transistor having a semi-conductive body and emitter, collector, and base electrodes and a current gain factor which decreases with frequency over said predetermined frequency band, said base electrode serving as an input electrode and said collector electrode serving as an output electrode, and a regenerative feedback circuit coupled from said collector electrode to said base electrode through a coupling capacitance, and circuit means including a timing capacitance coupled between said base electrode and said emitter electrode to render said oscillator alternately oscillatory and non-oscillatory, said coupling capacitance and said timing capacitance cooperating to match the amount of feedback from said collector electrode to said base electrode to the current-gain frequency characteristic of said transistor to increase the amount of feedback with frequency over said predetermined frequency band and maintain a substantially constant level of oscillation over the entire said frequency band of operation of the receiver.

5. A superregenerative radio receiver for operation over a predetermined frequency band which comprises an oscillator in the form of a transistor having a semi-conductive body and emitter, collector, and base electrodes and a current gain factor which decreases with frequency over said predetermined frequency band, one of said electrodes serving as an input electrode and another of said electrodes serving as an output electrode, first and second mutually coupled variable tuning inductances and a coupling capacitance, said first inductance being connected between said output electrode and the third of said electrodes, and said coupling capacitance and said second inductance being connected in series between said input electrode and said third electrode, and a timing capacitance and a discharge resistance connected in series between said input electrode and said third electrode, whereby said timing capacitor is alternately charged and discharged, causing said oscillator alternately to sustain oscillations and to cut off and cease oscillating, and said coupling and timing capacitances form a potentiometer matching the amount of feedback between said output and input electrodes to the current-gain frequency characteristic of said transistor to maintain a substantially constant level of oscillation over the entire said frequency band of operation of the receiver.

6. A superregenerative radio receiver for operation over a predetermined frequency band which comprises an oscillator in the form of a transistor having a semiconductive body and emitter, collector, and base electrodes and a current gain factor which decreases with frequency over said predetermined frequency band, first and second mutually coupled variable tuning inductances and a coupling capacitance, said first inductance being connected between said collector electrode and said emitter electrode, and said coupling capacitance and said second inductance being connected in series between said base electrode and said emitter electrode, and a timing capacitance and a discharge resistance connected in series between said base electrode and said emitter electrode, whereby said timing capacitance is alternately charged and discharged, causing said oscillator alternately to sustain oscillations and to cut off and cease oscillating, and said coupling and timing capacitances form a potentiometer matching the amount of feedback between said collector and base electrodes to the current-gain frequency characteristic of said transistor to maintain a substantially constant level of oscillation over the entire said frequency band of operation of the receiver.

References Cited in the file of this patent

UNITED STATES PATENTS 2,652,460 Wallace -------------- Sept. 15, 1953

OTHER REFERENCES

Article: "How to Make an Experimental Radiophone," by C. W. Palmer et al., from Radio Craft; vol. 5, issue #4, October 1953, pages 200, 201 and 232 from Scientific Library.

Article: "Transistor Receiver," by Quisenberry, from Radio and Television News for July 1953, page 122.